UNITED STATES PATENT OFFICE.

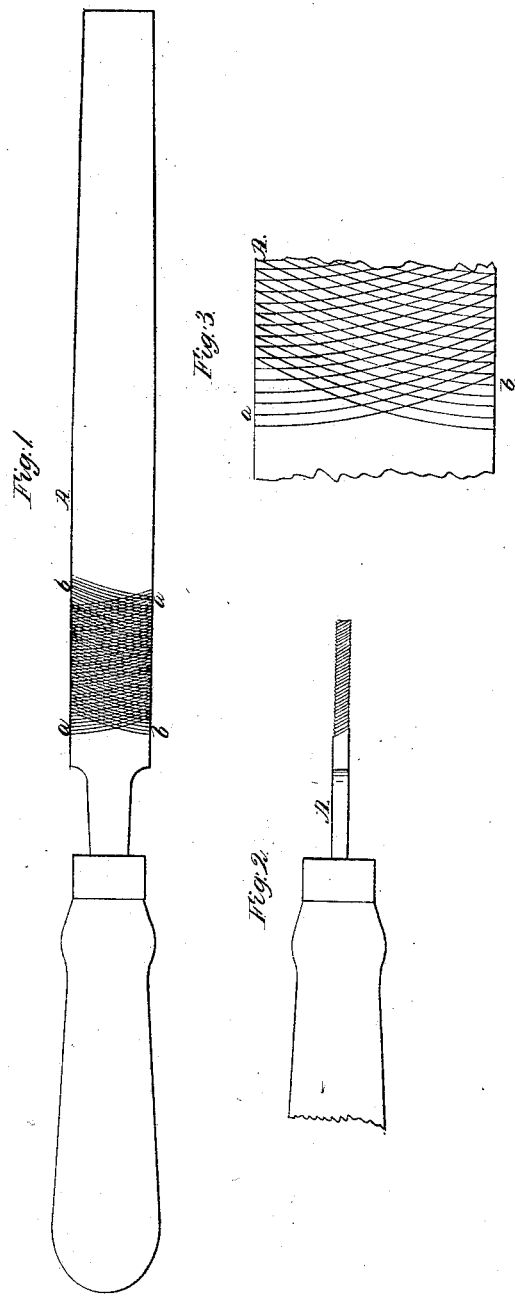

HAYWARD A. HARVEY, OF NEW YORK, N. Y.

IMPROVEMENT IN FILES.

Specification forming part of Letters Patent No. 44,724, dated October 18, 1864.

*To all whom it may concern:*

Be it known that I, HAYWARD A. HARVEY, of the city, county, and State of New York, have invented a new and useful Improvement in Files; and I do hereby declare that the following is a full, clear, and exact description thereof, reference being had to the accompanying drawings, making part of this specification, in which—

Figure 1 is a face view of a file on my improved plan; Fig. 2, an edge view of the same, and Fig. 3 a face view of a portion of such a file on an enlarged scale.

The same letters indicate like parts in the several figures.

In an application for Letters Patent of even date with this I have described a process of making files by cutting or chasing out the metal of the file-blank to form the teeth, as distinguished from the process heretofore practiced of forming the teeth by the process of swaging the face of the blank by a sharp-edged cutter; but, as therein descr bed, the making of flat files by the said process of chasing could only be performed by machinery giving a reciprocating motion to the chaser or cutter across the face of the blank.

The improvement intended to be secured by the present application relates to a form of file-teeth which will admit of chasing or cutting out the series of grooves to form the teeth of flat files on a face-lathe; and my said invention consists in making the teeth of files in the form of segments of circles extending across the face of the blank.

In the accompanying drawings, A represents a steel blank prepared in the usual way for making a flat file. On the faces of this blank I cut, by a suitable chasing or cutting tool, two series of grooves, *a* and *b*, each groove extending entirely across the face in the segment of a circle, and all the grooves of each series parallel with each other, and the two series crossing each other at the required angle to form pointed teeth, if it be desired to make files with pointed teeth; but, if desired, smoothing-files may be made on this plan with only one series of grooves, in which case each tooth will extend entirely across the face of the file.

By making files with the teeth of the form above described they can be chased or cut in a lathe, and a number of blanks cut at the same operation by mounting them on the face of a chuck, and the grooves for forming the teeth chased or cut out by a rotary motion, the blanks or the cutter being shifted at each operation, so as to make each successive cut on the same radius, if it be desired to make all the grooves parallel; but if the blanks should be mounted on a face chuck of very large diameter the grooves for forming the teeth can be cut out in concentric segments.

What I claim as my invention, and desire to secure by Letters Patent, is—

Making the teeth of files in segments of circles extending across the face, substantially as and for the purpose specified.

H. A. HARVEY.

Witnesses:
 WM. H. BISHOP,
 A. DE LACY.